(12) United States Patent
Levrier et al.

(10) Patent No.: US 7,361,144 B2
(45) Date of Patent: Apr. 22, 2008

(54) ULTRASOUND IMAGING SYSTEM WITH A HIGH LATERAL RESOLUTION

(75) Inventors: Claire Levrier, Rueil-Malmaison (FR); Claude Cohen-Bacrie, Manhattan, NY (US); Nicholas Villain, Clamart (FR); Jean-Michel Lagrange, Moissy Cramayel (FR); Robert R. Entrekin, Kirkland, WA (US)

(73) Assignee: Koninklijke Philips Electronics, N.V., Eindhoven (NL)

( * ) Notice: Subject to any disclaimer, the term of this patent is extended or adjusted under 35 U.S.C. 154(b) by 414 days.

(21) Appl. No.: 10/512,492

(22) PCT Filed: Apr. 22, 2003

(86) PCT No.: PCT/IB03/01587

§ 371 (c)(1),
(2), (4) Date: Oct. 25, 2004

(87) PCT Pub. No.: WO03/093862

PCT Pub. Date: Nov. 13, 2003

(65) Prior Publication Data

US 2006/0058668 A1    Mar. 16, 2006

(30) Foreign Application Priority Data

Apr. 30, 2002    (FR) .................................... 02 05439

(51) Int. Cl.
*A61B 8/00*        (2006.01)

(52) U.S. Cl. ...................................... 600/437; 600/443

(58) Field of Classification Search ................ 600/437, 600/448, 475, 477, 443; 128/204.21; 606/130
See application file for complete search history.

(56) References Cited

U.S. PATENT DOCUMENTS

| 5,184,623 A | | 2/1993 | Mallart | |
| 5,348,013 A | * | 9/1994 | Kanda et al. | ................ 600/443 |
| 6,120,450 A | | 9/2000 | Li | |

* cited by examiner

*Primary Examiner*—Eric F. Winakur
*Assistant Examiner*—Michael Rozanski
(74) *Attorney, Agent, or Firm*—W. Brinton Yorks, Jr.

(57) ABSTRACT

The invention relates to an ultrasound imaging system for forming an echographic image of a medium, which system includes a set [REC] of transducer elements [EL] which are operative in a transmission mode and in a reception mode for ultrasound waves, construction means [REB] for constructing echographic signals on the basis of signals [S[1] . . . S[N]] received on the transducer elements [EL], display means [DIS] which are coupled to the construction means [REB] in order to display an image of the medium formed by means of the echographic signals. The construction means [REB] are such that in so-called exclusion zones, in which a coherent reflector is detected and which are determined by determination means [DET], the reception delays [D] are estimated in a manner [INT] other than that [CORR] used for the other zones. The calculation [CAL] of echographic signals is then carried out on the basis of the estimated delays [D[Z],Di[Z]}. The invention enables a correction of phase aberrations and nevertheless offers an excellent lateral resolution, notably in the case of point coherent reflectors.

9 Claims, 5 Drawing Sheets

ULTRASOUND IMAGING SYSTEM WITH A HIGH LATERAL RESOLUTION

The invention relates to an ultrasound imaging system for forming an echographic image of a medium, which system conventionally includes a set of transducer elements which operate in a transmission mode and in a reception mode for ultrasound waves. The inhomogeneities of the speed of sound in the biological media cause phase aberrations which degrade the quality of the images. Various techniques enabling the correction of such aberrations are known to a person skilled in the art. One of these techniques consists in aligning, by way of intercorrelation, the signals received by the various transducers before summing these signals so as to form the echographic signal. One of the drawbacks of this technique resides in the fact that it leads to a loss of lateral resolution, notably at the level of small coherent reflectors.

A system utilizing this technique is known, for example, from the document "Phase aberration correction using signals from point reflectors and diffuse scatterers: Basic Principles", IEEE Transactions on Electronics, Ferroelectrics and Frequency Control, Vol. 35(6), pp. 758-767, 1988. The system disclosed in the cited document utilizes a technique for the correction of phase aberrations by intercorrelation of the signals received on each of the transducers. However, this system is sensitive to small point reflectors, which are present in the emission beam but not on the axis thereof. Actually, the signals diffused by a point reflector situated outside the axis of the beam are recorded by the transducer elements with a global linear tilt which is preserved after a correction of the time of arrival on said elements by way of geometrical delays. Because of the tilt of the signals, the sum of the signals received on the elements will not result in a large amplitude response of the medium. The response of the medium at the depth considered, therefore, will not be biased by the presence of this reflector. On the other hand, when the correlation is used, the signals emanating from the off-axis reflector being re-aligned, the contribution of this reflector to the echographic signal will be very large.

It is an object of the invention to provide an adaptive ultrasound imaging system, which enables correction of the phase aberrations.

The object of the invention is achieved by means of a system in conformity with the introductory paragraph, which is characterized in that it comprises:
- a set of transducer elements which operate in a transmission mode and in a receiving mode for ultrasound waves;
- construction means for constructing echographic signals on the basis of signals received on said transducer elements;
- display means which are coupled to said construction means in order to display an image of the medium formed by means of the echographic signals, said construction means, including:
- determination means for determining so-called exclusion zones in which at least one coherent reflector is detected;
- first estimation means for estimating reception delays for the zones outside said exclusion zones;
- second estimation means for estimating reception delays for the exclusion zones on the basis of delays estimated in the zones outside said exclusion zones;
- calculation means for calculating echographic signals on the basis of said estimated delays.

Thus, the system in accordance with the invention avoids an estimation of delays by correlation in the zones in which a coherent reflector is detected. It thus enables a fine analysis of small point reflectors present in the medium. An ultrasound imaging system, which is adaptive as a function of the nature of the imaged medium, is thus provided in accordance with the invention. In an advantageous embodiment, the second estimation means for estimating reception delays for the exclusion zone perform an interpolation of delays within said exclusion zone on the basis of delays estimated by the first estimation means in the zones outside said exclusion zone. The calculation of delays within the exclusion zone is realized specifically by means of a linear interpolation, in the direction perpendicular to the transducer array, of delays estimated in the zones outside said exclusion zone.

The invention enables the introduction of means for improving the phase aberration corrections at the level of small coherent reflectors into any ultrasound apparatus. Thus, the invention can be advantageously used in the field of medical imaging and more specifically in the field of ultrasound imaging of the mammae for which the detection of small point reflectors (microcalcifications) is very important. In one of its applications, the invention also advantageously concerns the imaging by image superposition or spatial compound imaging; such imaging consists of the excitation of a medium in different directions and of combining the various images so as to obtain a more complete and less noisy image. The point reflectors are very poorly defined by this technique, because the summing of the wide peaks obtained after correlation removes all details from the combined image. By allowing an improved response by coherent reflectors viewed at the various beam angles, the invention enables a final image of point reflectors to be obtained with a better spatial resolution.

The invention will be described in detail hereinafter with reference to the accompanying diagrammatic drawings, in which.

The following description is given to allow a person skilled in the art to carry out and utilize the invention. Various alternatives to the preferred method will be evident to a person skilled in the art and the generic principles of the invention as disclosed herein can also be applied to other embodiments. Thus, the present invention is not to be regarded as being limited to the embodiment described herein, but rather as having the much wider scope in conformity with the principles and features described hereinafter.

Figure 1:
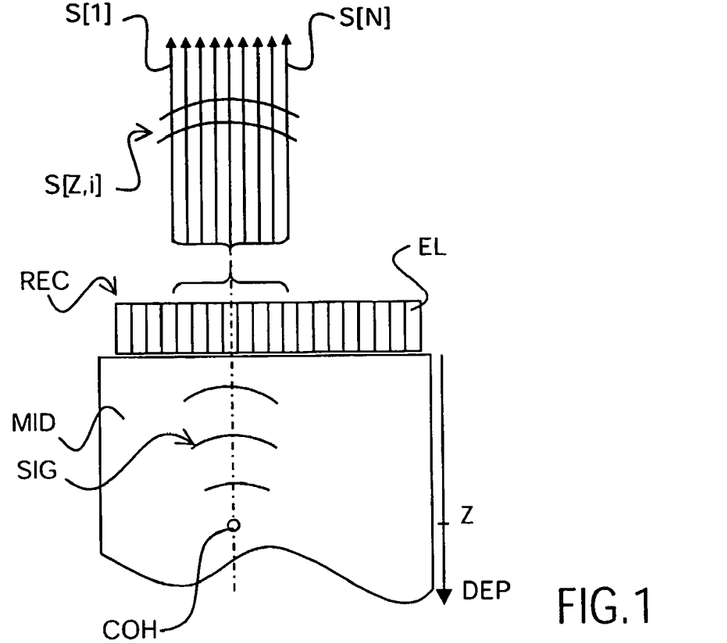
FIG. 1 shows a diagram illustrating the reception of signals from a medium in accordance with the invention.

FIG. 1 shows a diagram illustrating the reception of ultrasound signals in conformity with the invention. A medium MID which is excited by ultrasound waves returns signals SIG. In order to adapt the correction of the delays to the contents of the medium, it must first be possible to detect the presence of coherent reflectors in the medium. This first part of the invention utilizes, for example, the technique disclosed in the previous French patent application No. 01 06747 in the name of applicant in order to provide, on the basis of signals received on each of the transducer elements, a binary image of the medium which signals the presence of coherent reflectors.

In conformity with FIG. 1, the signals are received in a conventional manner on a given number N of elements present in an array REC of elements. Generally speaking, the same array REC serves also for transmission. Conventionally, a finite number of elements of the array REC is used in the transmission mode, said elements being excited so as to focus the wave into a beam aligned along a line. The line along which the medium is excited may extend perpendicularly to the array of elements EL as shown in FIG. 1 or it may enclose an arbitrary angle relative to the same array of elements EL. The excitation at different angles will be used, for example, for forming images by means of the so-called compounding technique, said excitation then taking place successively in several different directions for the same zone, the images obtained subsequently being combined.

The system and the method proposed in accordance with the invention determine a so-called exclusion zone when a point reflector is detected by analysis of the set of signals received. The advantage of the method in accordance with the invention is the calculation of reception delays of ultrasound waves in a first manner for the zones outside said exclusion zone and in a second manner for the exclusion zone. For example, the delays within the exclusion zone are calculated by utilizing the delays calculated within zones situated outside said exclusion zone. Subsequently, the method in accordance with the invention enables the formation of an image on the basis of delays calculated in conformity with conventional methods, which are known from the state of the art. The diffusion of the ultrasound wave by a coherent reflector produces a reflected signal SIG, which is received by the array of elements EL. The reflected signal arrives at each element of the array REC of elements at different instants. The signal defines in time a set of signals received S[i], that is, S[1] to S[N] in this case, meaning as many signals as there are elements activated in the receiving mode. A reflection at the depth DEP equal to Z produces a signal S[i] on the element i, i being included in the interval [1,N]. In FIG. 1, N elements EL are activated for the reception. The conventional analysis, resulting in the formation of an image on the basis of this set of signals, consists in the focusing, in the receiving mode, of the set of signals received each time when the beam is displaced on the array of elements, after which an image is constructed on the basis of echographic amplitudes reconstructed for each position of the beam. This operation comprises two steps: a time shift of signals received at different instants, which phenomenon is notably due to the difference in position of the elements relative to the reflector in the reception mode (geometrical correction), and summing of the shifted signals on the various elements in order to reconstruct the echographic signal.

Figure 2:
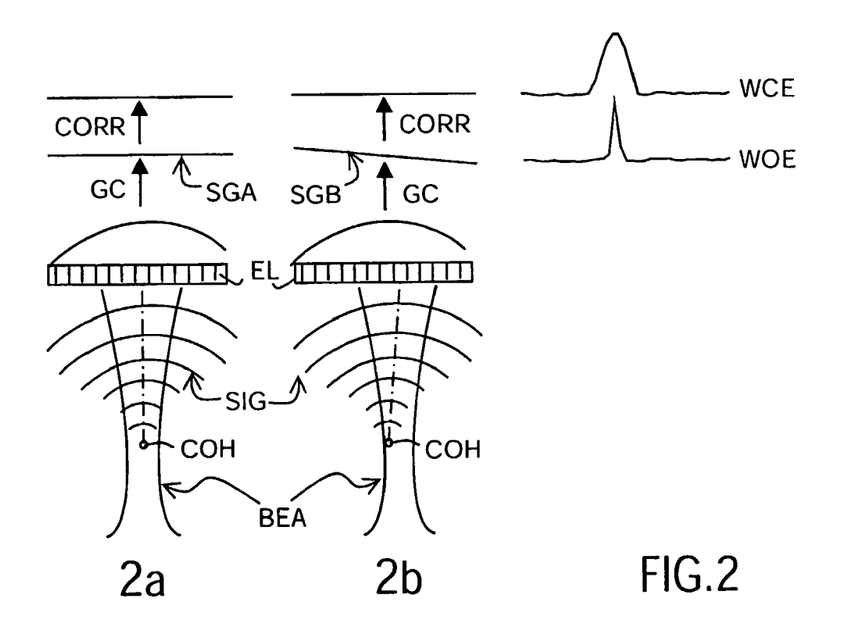
FIG. 2 shows a diagram illustrating the technical problem to be solved by the invention.

FIG. 2 illustrates the problem to be solved by the invention. The FIGS. 2a and 2b diagrammatically show the beam BEA along which the medium MID is excited. In FIG. 2a, the coherent reflector COH is centered relative to the beam. Thus, when the geometrical correction for the times of arrival GC is applied, a corrected signal SGA is obtained which is identical for all elements for the same depth. The summing of the signals for all receiving elements thus produces a large value for the echographic signal. In FIG. 2b the position of the beam BEA is such that the coherent reflector COH is situated off-center with respect to the beam BEA. Thus, when the geometrical correction GC has been performed, the set of signals SGB will not be in phase. This is graphically translated by the fact that the signals received by the various elements are not aligned after geometrical correction. The summing of the signals for all receiving elements then produces a small value for the echographic signal. The appearance of the echographic signal is then as represented by the curve WOE. In order to correct the phase aberrations due to the inhomogeneities of the speed of sound in the medium, conventionally a correlation CORR is applied to the signals shifted by the geometrical delays. Subsequently, the summing is performed for all elements and an echographic amplitude is obtained for the position of the beam under study. Plotting this in a graph showing the amplitude of the echo at the depth of the point diffuser as a function of the lateral position of the beam produces a curve of the amplitude of the echo as a function of the number of the element of the transducer, said curve having the appearance of the curve WCE. The weak point of such a technique is the widening of the peak, which represents the coherent reflector, thus causing a loss at the level of the lateral resolution. It is notably an object of the invention to eliminate this drawback of reduced lateral resolution.

Figure 3:
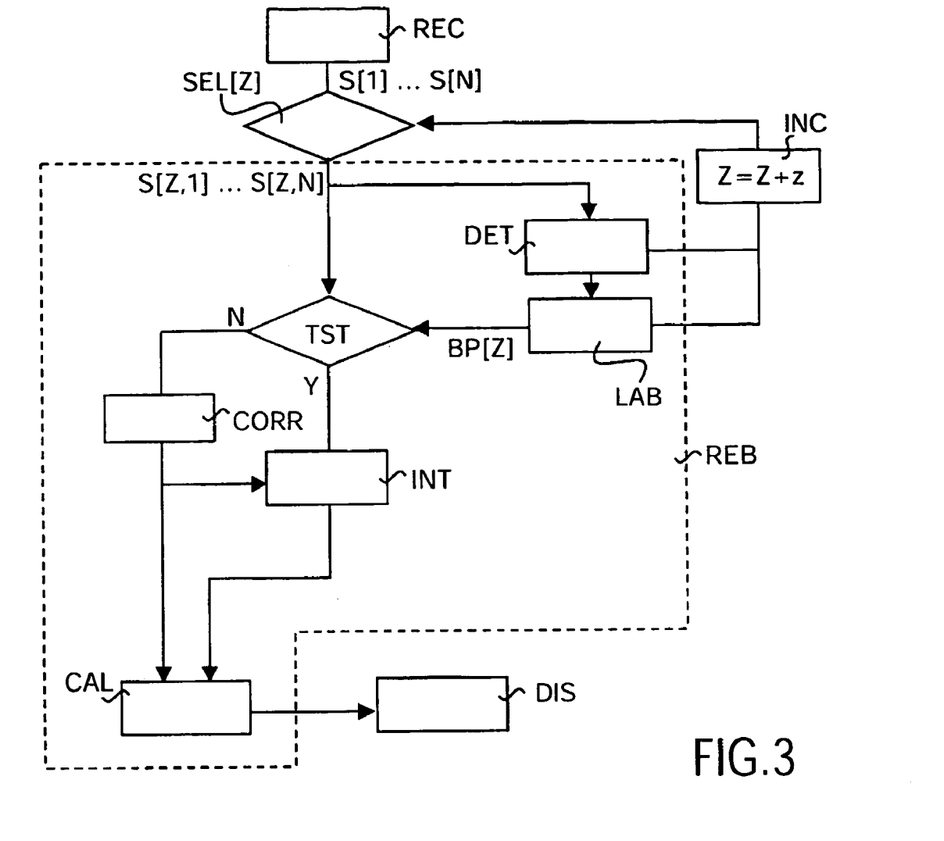
FIG. 3 shows a functional diagram of a method in accordance with the invention.

FIG. 3 shows a functional diagram of a method in accordance with the invention. The aim of this method is to form an echographic image on the basis of echographic ultrasound signals S[i] received from a medium excited by means of ultrasound waves. The description is given for a specific version of the invention. According to this version, the invention utilizes a 1D (one-dimensional) network of transducers, but the method can also be carried out while using 1.5D, 1.75D, 2D . . . transducer networks. The method in accordance with the invention includes a reception step REC for receiving echographic ultrasound waves S[i] on an array of reception elements. The waves S[i] received on the array of elements define a set of received signals S[1] . . . S[N]. The instants of arrival of the received signals are corrected by way of geometrical delays. This correction is carried out in a customary manner in the receiving mode on an array of elements and hence will not be described in detail herein. The method in accordance with the invention processes the data in conformity with their arrival in time; this corresponds at each instant to a depth Z. In FIG. 3 this progression in depth is symbolized by a selection step SEL for selecting the depth Z in order to simplify the explanation of the idea of the invention. Actually, the signals thus corresponding to a given depth Z are denoted as S[Z,1] . . . S[Z,N]. The signals S[i] are received during a given period of time and only a part of these signals S[Z,i] corresponds to the echo reflected by a zone situated at the mean depth Z. These signals are subsequently used in a step for the construction of echographic signals REB and are notably presented, during said step for the construction of echographic signals REB, at the start of a determination step DET for determining the so-called exclusion zone in which a point reflector is detected by analysis of the set of signals S[i] received. An exclusion zone is determined when a coherent reflector is detected. The determination of an exclusion zone is thus based on a detection of a coherent reflector. The presence of a coherent reflector not being obligatory in a medium, it may be that no exclusion zone at all is determined. For the purpose of the invention, the case where a coherent reflector is detected will now be described. In the case where no coherent reflector whatsoever is detected (for example, on a line where there is no point reflector), the method corresponds, as we have seen, to that described above and correlation of the signals S[i] is performed on each line. For example, the determination step DET for determining exclusion zones is carried out by means of a method as described in the French patent application No. 01 06747. This step thus utilizes, for example, a method as described with reference to FIG. 4.

Figure 4:
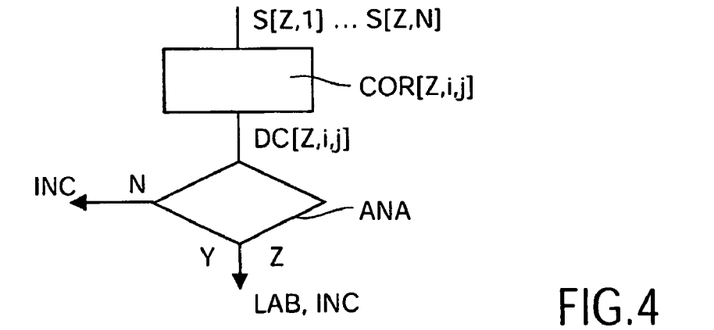
FIG. 4 shows a functional diagram illustrating an example of procedures for carrying out the step for determining exclusion zones.

FIG. 4 shows a functional diagram of an example of a version of the step DET for determining exclusion zones. This example proposes the use of the signals S[Z,1] to S[Z,N] as they arrive, for the depth Z, on the elements for the detection of the presence, if any, of a coherent reflector. This example proposes the intercorrelation of the signals S[Z,i]. This example advantageously utilizes the signals S[1] to S[N] after they have been shifted in time by geometrical correction, that is, after the first step of the above focusing and reception operation. The geometrical correction theoretically enables the signals received to be put in phase, the wave edge being horizontal when the coherent reflector is centered in the beam. Thus, it is easier to mark the signal portions S[Z,i] corresponding to a given depth. The signals returned by a coherent reflector result in a correlation maximum, which is generally large between neighboring echographic signals. Said maximum is then observed even for signals emanating from reception elements which are situated far apart. On the other hand, the maximum correlation values for signals corresponding to noisy data (speckle zone) decrease linearly as a function of the distance of the receiving elements and ultimately are canceled. This is the Van Cittert Zernicke theorem. The example of the method of determining an exclusion zone proposes an analysis of said correlation maxima in order to detect a coherent reflector within a medium giving rise to noisy data. In conformity with the proposed example, the signals S[Z,1] to S[Z,N] are thus correlated two by two within a step COR[Z,i,j], where i and j describe the interval [1,N]. Said step COR[Z,i,j] provides the correlation between the signals originating from the elements i and j for the depth Z. The values of the correlation maxima DC[Z,i,j] are obtained for each of the correlations COR[Z,i,j] formed between the signals received on the elements i and j. Said correlation maxima are subsequently analyzed in a step ANA so as to detect the presence of a coherent reflector on the line. The analysis step ANA can utilize, for example, a comparison of the correlation maximum with a threshold value. For example, when the correlation maximum calculated for two elements i and j exceeds this value, the presence of a coherent reflector is confirmed by the correlation step. This threshold value is determined while taking into account the Van Cittert Zernicke theorem and hence the distance of the elements i and j. Depending on the result of this analysis step, if a coherent reflector is detected (case Y), the zone wherefrom this information originates is provided with a label in a step LAB, after which the method analyzes another zone which corresponds to a mean depth Z=Z+z which has been incremented in a step INC. If no coherent reflector at all is detected (case N) in the analysis step ANA, the process directly increments the depth Z in the incrementation step INC. This incrementation may be more or less large so as to probe the medium in a more or less refined manner. The analysis is subsequently carried out at the next depth and the method can thus be applied to all depths of a medium: an analysis of the entire line of the medium is thus obtained. The labeling step LAB thus enables differentiation between the zones in which a coherent reflector is detected and those in which no coherent reflector at all is detected. For example, it is thus possible to form a binary image of the medium (or of the line of the medium which is excited) with, for example, a 0 at locations where no coherent reflector at all has been detected and a 1 where one or more coherent reflectors have been detected. FIG. 4 is given merely by way of example and any other method of marking a coherent reflector within a medium can be used as well. For example, a single calculation of the correlation between the signals on two remote transducer elements from among a given number of elements (for example, 10) may be used. The correlation maximum is then compared, in the same way as above, with a threshold value. Any other technique for marking a point reflector can in this case be used: analysis of the image intensity, selection of zones by the user.

Subsequently, referring again to FIG. 3, the invention carries out two distinct steps for the calculation of reception delays of ultrasound waves. A first step CORR calculates delays for the zones outside said exclusion zone, and a second step INT calculates the delays for the exclusion zone. The delays obtained are used in a step CAL for the calculation of the echographic image and a final image by means of conventional techniques for the formation of echographic images. Finally, a display step DIS is carried out. In the diagram shown here, a test step TST enables selection of one of the delay calculation steps for a depth Z. This step TST tests whether or not the selected depth Z bears a label BP[Z] of an exclusion zone or region which includes a coherent reflector COH. If the zone does not belong to an exclusion zone (case N), the delays are estimated by a first step CORR. If the zone belongs to an exclusion zone (case Y), this means that, referring to FIG. 5 and more specifically to FIG. 6a which is an enlargement of FIG. 5, that the depth Z observed is included in the interval (Z1; Z2] which defines the exclusion zone on the analyzed beam. The delays are then calculated by means of a second delay estimation step INT. In this case, for the depths other than that included in the interval [Z1; Z2], the delays have been estimated by way of the first delay estimation step CORR.

In an advantageous version of the invention, the second delay estimation step INT for estimating delays within the exclusion zone utilizes the delays calculated within zones which are situated outside said exclusion zone. In a preferred version, the delays within the exclusion zone are interpolations of the delays as a function of the depth. This interpolation is preferably linear in the preferred version. Such a linear interpolation is then carried out along the dotted lines in FIG. 6a. This example is given for an excitation perpendicular to the array of elements, but any other angle is also feasible for the excitation of the medium. The first delay estimation step for the zones outside the exclusion zones advantageously utilizes the correlation of signals received on the various transducer elements. This first step enables, as has been seen before, correction of the phase aberrations, which are due to the inhomogeneities of the speed of sound in the medium. At least the delays estimated by correlation for the two points situated at the front of the exclusion zone IDE (that is, at the depths Z1 and Z2) serve as references for the calculation of the delays by interpolation on the dotted line within the exclusion zone IDE. Delays calculated in the vicinity of these points may also be used for the interpolation.

Figure 6:
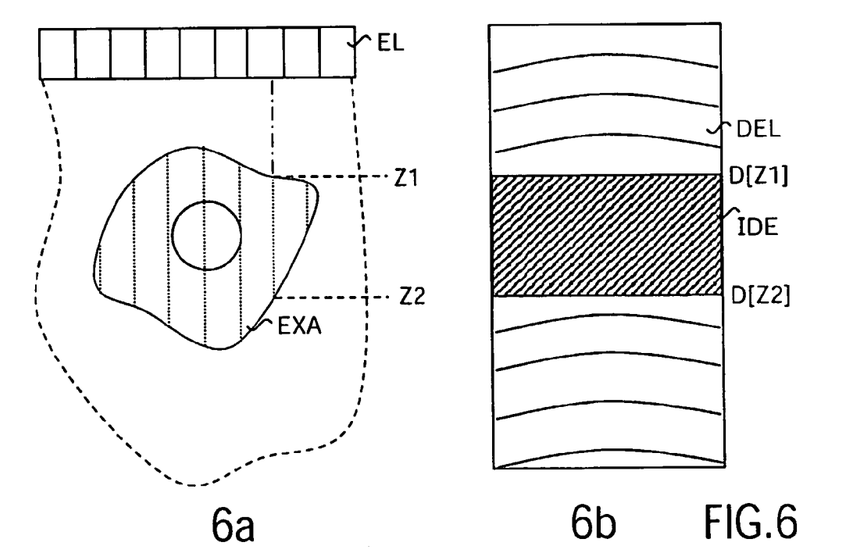
FIGS. 6a and 6b illustrate more exactly the effect of the invention in a preferred version.

FIG. 6b shows the part of a chart of delays corresponding to the position of the beam indicated in FIG. 6a. Inside the zone IDE the delays are interpolated linearly on the basis of delays calculated by correlation on the two straight lines separating the zone IDE from the zone DEL in which the delays are estimated by correlation. These two lines correspond to the depths Z1 and Z2 in conformity with the foregoing explanation. Generally speaking, the interpolation is carried out as a function of the depth Z as will be explained hereinafter. In the preferred version of the invention, the delays D[Z1] and D[Z2] estimated by the first step at the points situated on the excitation line at the depths Z1 and Z2 are then used in accordance with the invention so as to realize a linear interpolation of the delays Di[Z,Zϵ[Z1, Z2]] within the exclusion zone, that is, between the depths Z1 and Z2. Thus, in the case of a linear interpolation, for Zϵ[Z1,Z2]:

$$Di[Z] = \frac{Z2 \cdot D[Z1] - Z1 \cdot D[Z2]}{Z2 - Z1} + Z \frac{(D[Z2] - D[Z1])}{Z2 - Z1}.$$

Any other type of interpolation may also be used if the configurations of the system makes that necessary (for example, if the delays are not linear in the configuration: angular excitation . . . ). The interpolation may also be realized either in real time, that is, for each ultrasound "excitation", or once an image of the medium has been formed which includes the exclusion zones in which the delays are subsequently interpolated.

Figure 5:
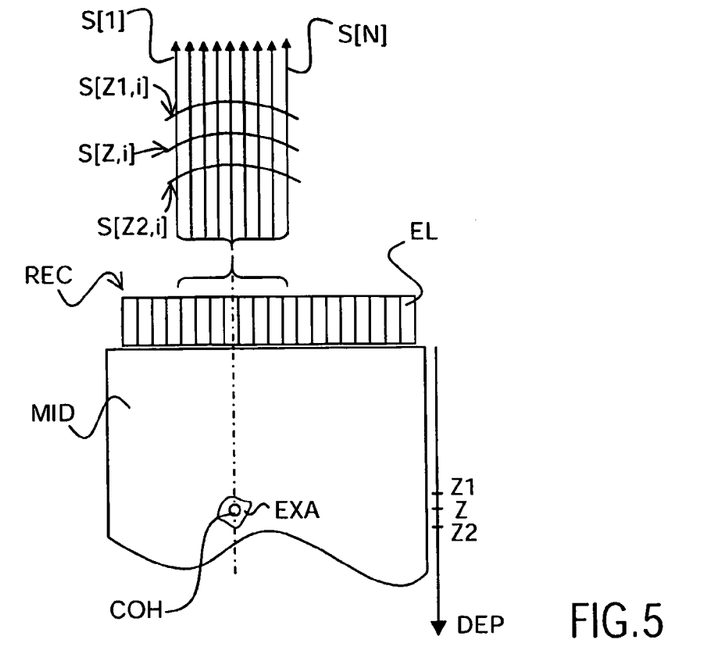
FIG. 5 shows a diagram illustrating the effect of the invention.

The invention thus consists of the adaptation of the correction of delays applied to the waves reflected by the medium and hence of the adaptation of the formation of the beam in the reception mode as a function of the analysis of the medium. It is also to be noted that, for example, in conformity with a further version of the method first a binary image with two (or more) dimensions is determined for the entire medium. In this binary image there is determined an exclusion zone EXA in which the coherent reflector COH is situated. Subsequently, this binary image is used to form the final image with the echographic data. As opposed to the version described previously, in this case the exclusion zone as shown in the FIGS. 5 and 6a is known in its entirety in the binary image.

Figure 7:
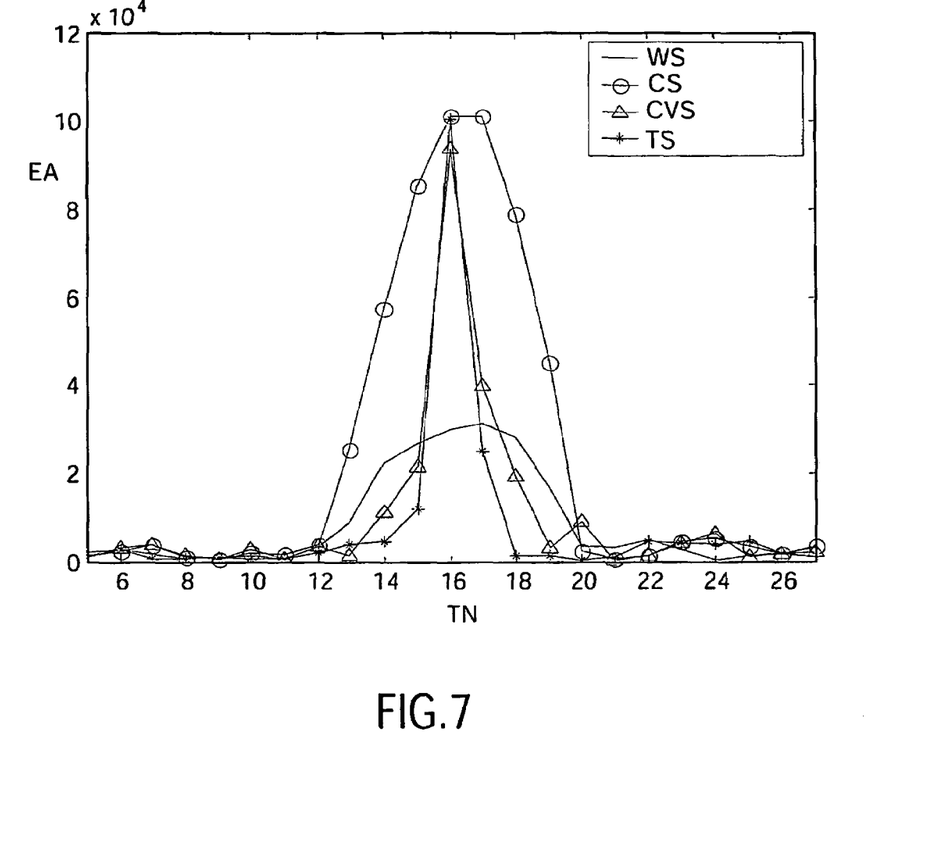
FIG. 7 illustrates the effects of the invention on the amplitude of the echo of a point reflector.

FIG. 7 shows the result of the invention and the advantages thereof. A diagram in FIG. 7 contains the amplitude of the echoes obtained at the level of a point reflector as a function of the number of transducer elements and hence of the position of the emission beam on the array of elements. The curves of FIG. 7 correspond to a reflection from a point reflector. The curve TS corresponds to the echographic response of the diffuser, the true speed of sound in the medium being known. In the real medium, this real speed of sound, however, is not homogeneous and phase aberrations are introduced in the medium; this leads to a curve WS which is the result obtained with delays corrected exclusively by geometrical correction, that is, for an assumed speed of sound. This curve does not enable suitable localization of the coherent reflector. The use of the correlation for the formation of the image produces the curve CS. It is to be noted that the correlation enables the amplitude to be found for the peak obtained with the true speed of sound. However, the lateral resolution is mediocre with respect to the curve corresponding to the true speed of sound TS. The curve CVS represents the amplitude of the echo obtained for this same coherent reflector when the invention is used. Clearly shown is the substantial improvement of the lateral resolution with respect to the curve CS where the correlation is used for all depths and for all positions of the beam. Actually, when the beam is centered on the element 16, corresponding to the position of the beam in which it is centered on the coherent reflector, the delays do not suffer from the use of the correlation and are always correct. Therefore, the peak obtained is exact. The problem imposed by the widening of the peak actually exists only for the positions of the beam which neighbor that for which the beam is centered on the reflector. In accordance with the invention, the values of delays in the vicinity of the point reflector are calculated on the basis of values of delays for points situated in a zone in which, thanks to the formation of the exclusion zone, no coherent reflector whatsoever has been detected. These delays, corresponding to zones situated far from the reflector, are not subject to the effect of the presence of the point reflector in the beam. Therefore, the curve CVS has a well-defined peak near that corresponding to the true speed of sound.

Figure 8:
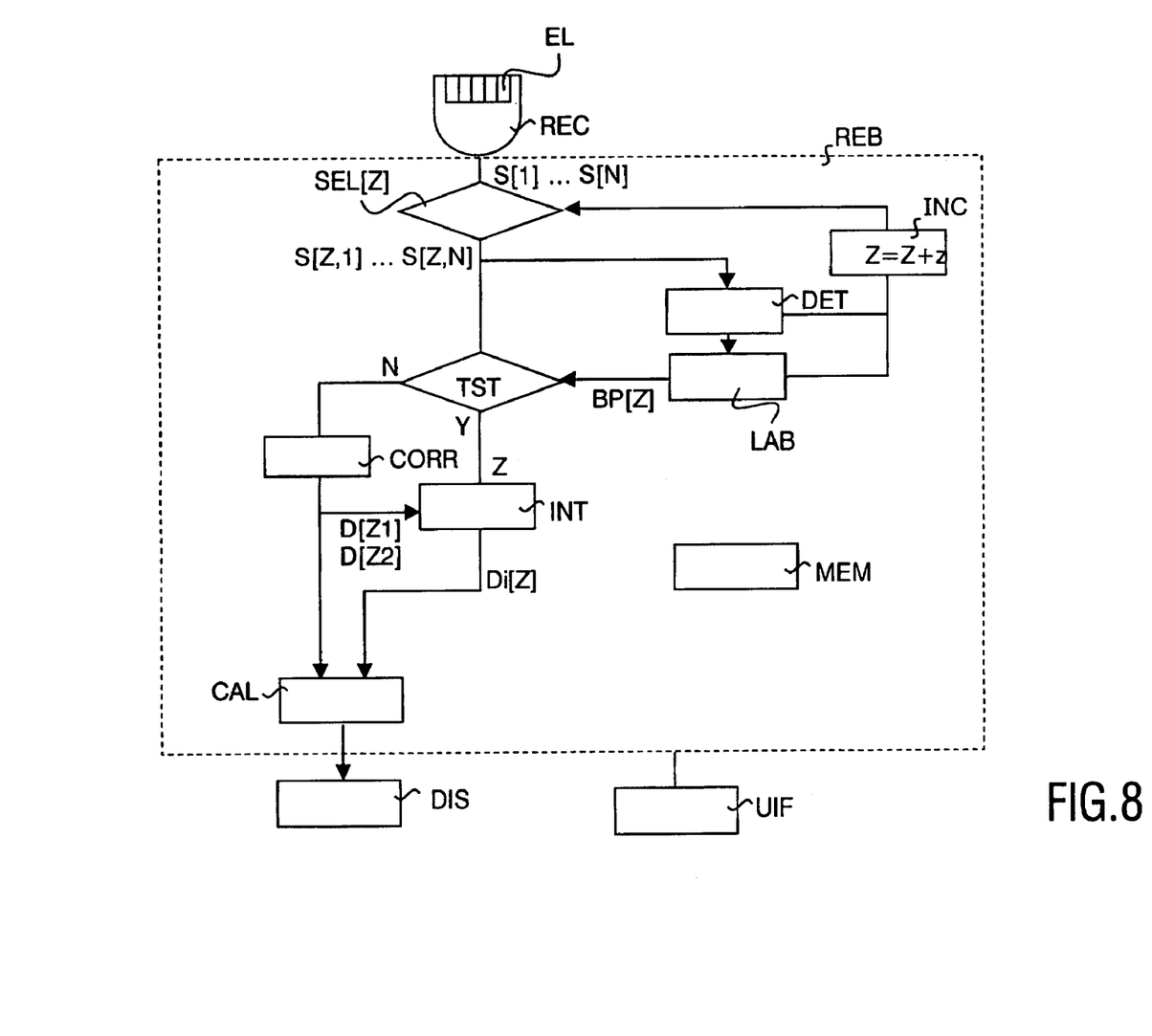
FIG. 8 is a diagrammatic representation of an ultrasound imaging system in accordance with the invention.

FIG. 8 shows diagrammatically a system in which a method in accordance with the invention is carried out. This system includes a probe for the reception of echographic signals REC, which probe includes receiving elements EL. Said probe REC is connected, by way of conventional means, to means REB for the construction of echographic images. Said construction means REB can be complemented by data processing means customarily used in ultrasound imaging. Such conventional means are simply juxtaposed with the means for the construction of echographic signals, that is, generally without interactions with the means for the construction of echographic signals or with interactions which do not affect the principle of the invention as explained in the following description of the means REB for the construction of echographic signals. Such conventional means are not described herein. These conventional means advantageously include means for shifting, by way of a geometrical correction, the signals S[1] to S[N] received by the elements EL of the probe REC. Generally speaking, this step is carried out in every ultrasound apparatus in order to enable the subsequent reconstruction of the echo of the medium. In accordance with the invention, the construction means REB for echographic signals process the data as a function of the depth Z (or, in an equivalent manner, as a function of the receiving instant). In the diagram of FIG. 8 this data processing as a function of the value Z is performed by the selection means SEL which enable selection of the portions of signals which correspond to given zones of the medium which have a mean depth Z. The signals are thus characterized by the depth wherefrom they originate: S[Z,1] . . . S[Z,N]. The means for the construction of echographic signals include determination means DET for determining an exclusion zone in which at least one point coherent reflector is detected. Said determination means DET operate, for example, in conformity with the method described with reference to FIG. 4 and generally utilize software means for data processing. Notably an incrementation step for the depth INC enables determination of the exclusion zones through the entire depth of the medium excited by the ultrasound beam. The determination means DET are complemented in practice by zone labeling means LAB which assign a label BP[Z] to the zone of depth Z on the excitation line which corresponds to the echoes received. Said zone labeling means enable test means TST to test the nature of the depth Z on the excitation line being processed. If the label BP[Z] is such that the zone is not classified as being an exclusion zone, the delays are estimated by first delay estimation means CORR which utilize, for example, the correlation of signals received by the adjacent elements. These means operate according to techniques which are known from the state of the art. If the label BP[Z] is such that the zone is classified as an exclusion zone, the delays are estimated by second delay estimation means INT which utilize, for example, an interpolation of delays on the basis of those estimated by the first estimation means CORR in the zones outside the exclusion zones. Finally, means CAL for calculating echographic signals utilize the delays calculated by the two estimation means so as to obtain the echographic signals and form an image which is subsequently displayed on conventional display means DIS. The calculations include notably the summing of the signals obtained on the transducer elements for a given position of the emission beam. Such summing is carried out by conventional means, which are known to a person skilled in the art.

The means CAL for calculating echographic signals may operate in conformity with principles, which are known from the state of the art. In accordance with the invention, only the estimation of delays changes, their use being the same as in the known state of the art. The estimation means and the calculation means advantageously operate in relation with a memory MEM which stores the intermediate results and enables the data received to be preserved for the various depths and for the various positions of the excitation line of the medium. A user interface UIF is advantageously connected to the means REB for the construction of echographic signals in order to control these means and their parameterizing; for example, the modification of the threshold value in the determination means DET may be offered to the user as well as a modification of the incrementation value of the depth, said values determining the precision of the detection.

The invention can provide an enhanced detection of coherent reflectors within a homogeneous medium for which noisy signals (speckle) are obtained; in such signals it is generally difficult to detect coherent reflectors by means of known means. Moreover, in accordance with the invention a very high lateral resolution is obtained for these point reflectors.

The above means for carrying out the functions involved in the steps of the method in accordance with the invention may be integrated as an additional application in a conventional ultrasound apparatus or be implemented in an independent apparatus which is intended to be connected to a conventional ultrasound apparatus in order to carry out the functions in accordance with the invention. There are numerous ways of realizing the functions involved in the steps of the methods in accordance with the invention by means of software and/or hardware means which are available to those skilled in the art. Therefore, the Figures are given merely in diagrammatic form. Consequently, even though the Figures show different functions realized by different blocks, it is not excluded that a single software and/or hardware means enables the implementation of several functions. This does not exclude a combination of software and/or hardware means enabling the realization of a function. Even though the invention has been described with reference to the embodiments presented, a person skilled in the art will immediately recognize that there are alternative versions for the described embodiments and that these versions remain within the scope of the present invention. Thus, numerous modifications can be carried out by a person skilled in the art without departing from the scope defined in the following claims.

The invention claimed is:

1. An ultrasound imaging system for forming an echo graphic image of a medium, comprising:
    a set of transducer elements, which operates in a transmission mode and in a receiving mode for ultrasound waves;
    construction means for constructing echographic signals on the basis of signals received on said transducer elements;
    display means, which are coupled to said construction means in order to display an image of the medium formed by means of the echographic signals, said construction means including:
    determination means for determining an exclusion zone in which at least one coherent reflector is detected;
    first estimation means for estimating reception delays for the zones outside said exclusion zone;
    second estimation means for estimating reception delays for the exclusion zones on the basis of delays estimated in the zones outside said exclusion zone; and
    calculation means for calculating echographic signals on the basis of said estimation delays.

2. A system as claimed in claim 1, wherein the second estimation means for estimating reception delays of signals for the exclusion zone comprises means for performing an interpolation of delays within said exclusion zone on the basis of delays estimated by the first estimation means in the zones outside said exclusion zone.

3. A system as claimed in claim 2, further comprising transducer actuation means for operating the transducer elements in the emission mode in such a manner that the excitation of the medium is realized in the form of a beam centered on one of the elements along a direction which is referred to as the focusing direction, wherein the interpolation of delays within the exclusion zone on the basis of delays estimated in the zones outside said exclusion zone is a linear interpolation according to the depth.

4. A system as claimed in claim 2, wherein the first estimation means for estimating reception delays of echo signals for the zones outside said exclusion zone comprises means for performing a correlation of delays in the zones outside the exclusion zone.

5. A system as claimed in claim 1, wherein the first estimation means for estimating reception delays of echo signals for the zones outside said exclusion zone comprises means for performing a correlation of delays in the zones outside the exclusion zone.

6. A method of imaging a medium by means of ultrasound, comprising:
    transmitting of ultrasound energy to the medium by transducer elements;
    receiving of ultrasound waves by the transducer elements in response to the ultrasound energy transmitted by the transducer elements;
    constructing of echo graphic signals on the basis of signals received by said transducer elements;
    displaying of an image of the medium formed by means of the constructed echo graphic signals; said constructing step including:
    determining an exclusion zone in which a point reflector is detected and based upon the detection,;
    estimating reception delays for the zones outside said exclusion zone;
    estimating reception delays for the exclusion zone on the basis of delays estimated in the zones outside said exclusion zone; and
    calculating echographic signals on the basis of said estimated delays.

7. The method of claim 6, wherein estimating reception delays for the zones outside the exclusion zone comprises performing a correlation of delays in the zones outside the exclusion zone.

8. The method of claim 7, wherein estimating reception delays for the exclusion zone comprises performing an interpolation of delays within the exclusion zone on the basis of delays estimated by the first estimation means in the zones outside the exclusion zone.

9. The method of claim 6, wherein estimating reception delays for the exclusion zone comprises performing an interpolation of delays within the exclusion zone on the basis of delays estimated by the first estimation means in the zones outside the exclusion zone.

* * * * *